April 28, 1931. J. A. RAMSEY 1,802,619
PISTON RING CONSTRUCTION
Filed March 9, 1931
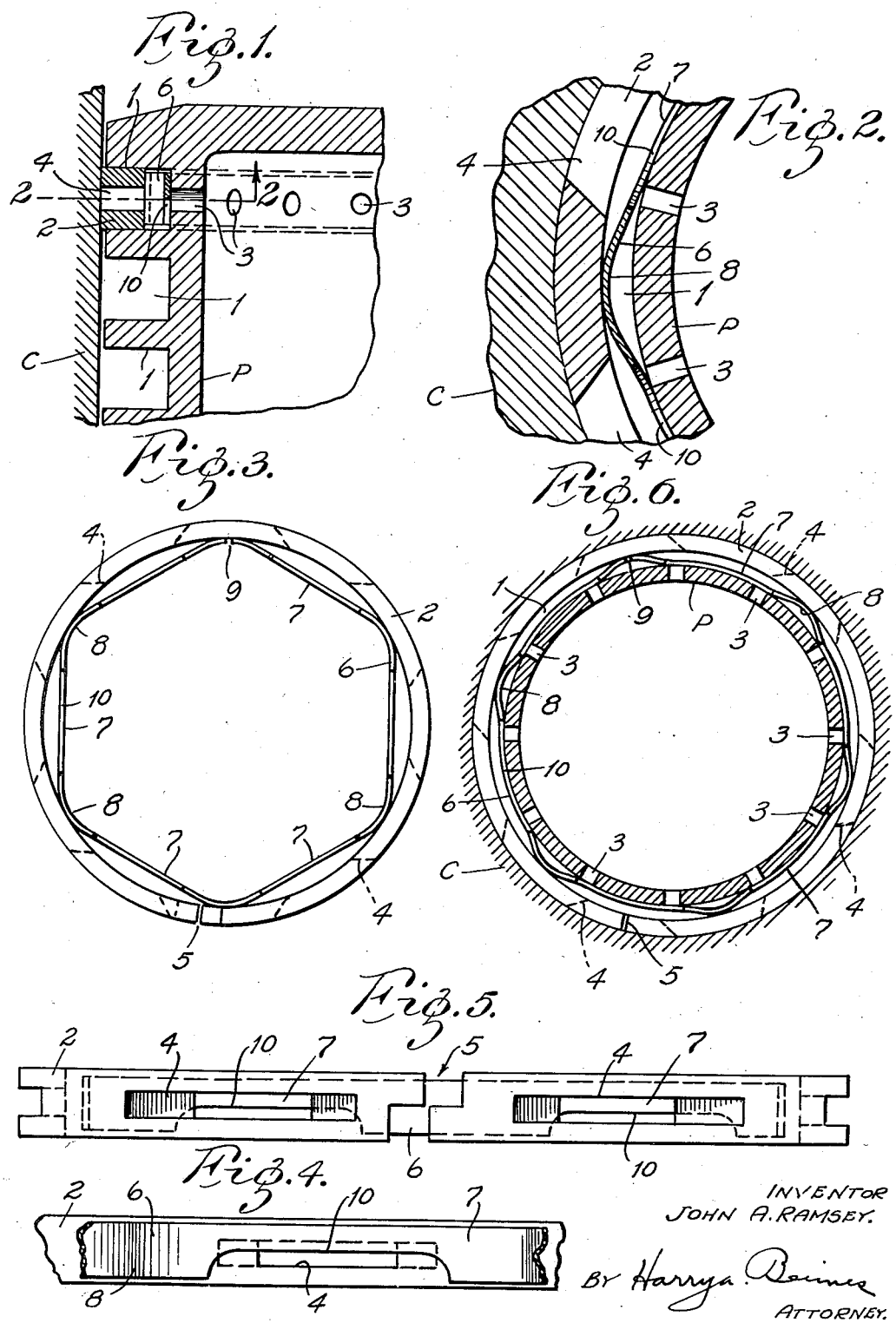

Patented Apr. 28, 1931

1,802,619

UNITED STATES PATENT OFFICE

JOHN A. RAMSEY, OF ST. LOUIS, MISSOURI, ASSIGNOR TO RAMSEY ACCESSORIES MANUFACTURING CORPORATION, OF ST. LOUIS, MISSOURI, A CORPORATION OF MISSOURI

PISTON-RING CONSTRUCTION

Continuation of application Serial No. 477,254, filed August 23, 1930. This application filed March 9, 1931.
Serial No. 521,058.

My invention has relation to improvements in piston ring construction, and is directed more particularly to that type of piston ring known as an oil ring and adapted to prevent oil leakage past the piston into the combustion space of the cylinder. The invention is a continuation of my copending application Ser. No. 477,254, filed August 23, 1930.

The object of the invention is to provide a combination outer ring and inner ring, or expander, the outer ring being held in close engaging relation with the cylinder wall through the substantially uniform pressure exerted against it by the inner ring. A further object of the invention is to provide an inner ring or expander having elongated recesses in one edge adapted to register with oil drainage slots in the outer ring and with a plurality of oil drainage ports in the piston wall. It is important that the recesses in the expander be so shaped that when the expander is compressed between the bottom of the piston ring groove and the piston ring there will always be free communication between the slots in the piston ring and the drainage ports in the piston. In structures wherein the expander is provided with notches or vent holes it often happens that they assume relative positions so as not to register, whereupon they fail to perform their function of draining surplus oil. This is true because a substantial portion of the expander lies in intimate contact with the inner wall of the piston ring groove and if the oil ducts in the groove are slightly to one side of the notches in the expander, the latter will close said ducts against the passage of oil. Since the notches are of substantially the same diameter as the oil ducts, more often than not, they do not register, whereby the notches in the inner ring fail in their purpose. As distinguished therefrom, the provision of the elongated recesses or openings overcomes this difficulty inasmuch as all that portion of the inner ring which engages the inner wall of the piston ring groove over the oil ducts is open to freely permit passage of oil therethrough.

These advantages, together with others inherent in the invention will be better apparent from a detailed description thereof in connection with the accompanying drawings in which:

Figure 1 is a central vertical section through a piston showing it mounted in a cylinder wall with the ring construction positioned therein; Fig. 2 is a section taken on the line 2—2 of Fig. 1; Fig. 3 is a plan view of the ring construction dismounted from the piston; Fig. 4 is a side elevation of a portion of the ring construction from the inner side thereof; Fig. 5 is the same as Fig. 4 showing a side view of the ring construction from the outer side thereof; Fig. 6 is a cross-section through the piston taken on a plane corresponding to that on which Fig. 2 is taken, the piston ring and expander being left in elevation.

Referring to the drawings C represents a cylinder in which a piston P is operable, said piston being provided with the usual ring grooves 1 for receiving the piston rings 2. The ring grooves 1 are provided with a plurality of equally spaced oil drainage ports 3 traversing the piston wall entirely around the circumference thereof (as shown Fig. 6).

The piston ring 2 is adapted to intimately engage the cylinder wall for the purpose of performing its usual function of holding compression in addition to which it is provided with a series of circumferentially disposed slots, or oil passages 4 to receive surplus oil that may be forced past the bottom edge of the ring 2 on the downward stroke of the piston. The ring 2 is split and provided with the usual step-joint (as indicated at 5).

The outer ring 2 is mounted in intimate contact with the cylinder wall by pressure exerted against it radially outwardly through the inner ring, or expander 6 which is of a general polygonal shape having its substantially straight sides 7 connected by means of arcuate portions 8. The expander is formed of a ribbon of spring steel and is of a width substantially the same as that of the outer ring 2 and is split at one of the arcuate portions (as indicated at 9). By referring to Fig. 6 it will be seen that the expander is positioned in piston ring groove 1 behind the ring 2 and is compressed so that the sides 7 intimately hug the bottom wall of the piston ring groove 1 while the arcuate portions bear against the ring 2 at equally spaced points around its inner surface. Therefore, if the sides 7 of the expander were of the same width as the arcuate portions the oil drainage ports 3 in the piston wall would be sealed by the expander when in use. Then, too, if the expander is merely notched along one edge of its sides 7 these notches may not register with the ports 3 in which event they would fail to function. In order that the oil drainage ports may at no time be sealed to the flow of surplus oil therethrough, I have provided recesses 10 in the side 7 of the expander, said recesses extending substantially the entire length of the sides 7 so that they will span adjacent oil ports 3, 3 when placed in the piston ring groove. When the recesses are of such length (Fig. 6) it will be impossible to seal the ports 3 no matter what position the expander may assume in the groove when in use. It is apparent that if the expander should travel circumferentially in the groove a sufficient distance so that any recess will move past any definite port 3 it will continue in register with the next adjacent port until it has passed beyond this port, at which time the first port will again be uncovered by the following recess. The recesses 10 are of a width substantially equal to one-half the width of the expander so as to insure that half the oil drainage ports 3 will always be uncovered. It is therefore apparent that when a piston ring construction as herein described is employed in a piston the outer ring will be maintained in intimate yielding contact with the cylinder wall so as to reduce to a minimum the escape of oil past the face of the ring. At the same time such oil as does attempt to pass the face of the ring will be received in the ring slots from which it is free to drain through the expander recesses and piston ports into the interior of the piston.

Having described my invention I claim:

1. In combination with a piston having a circumferential groove, a piston ring in said groove, an expander in the groove between the ring and bottom of the groove, said piston ring having a series of circumferentially disposed oil ports, said expander being of a general polygonal shape and adapted to exert radial pressure on the ring, the piston wall having a series of equally spaced oil ports extending inwardly from the bottom of the groove, said expander having a linear recess in one edge of each side, and said recess being of a length slightly in excess of the distance between adjacent oil ports.

2. As a new article of manufacture, an expander for piston rings comprising a ribbon of spring metal of general polygonal shape, said expander having sides of substantially plane surfaces and arcuate portions connecting adjacent sides, some of said sides having corresponding edges recessed throughout substantially their entire length, whereby when placed in a piston ring groove having equally spaced oil drainage ports said recesses will span two adjacent ports.

3. As a new article of manufacture, an expander for piston rings comprising a ribbon of spring metal of general polygonal shape, said expander having sides of substantially plane surfaces and arcuate portions connecting adjacent sides, some of said sides having corresponding edges recessed throughout substantially their entire length, and substantially one-half their width, whereby when placed in a piston ring groove having equally spaced oil drainage ports said recesses will span two adjacent ports.

In testimony whereof I hereunto affix my signature.

JOHN A. RAMSEY.